UNITED STATES PATENT OFFICE.

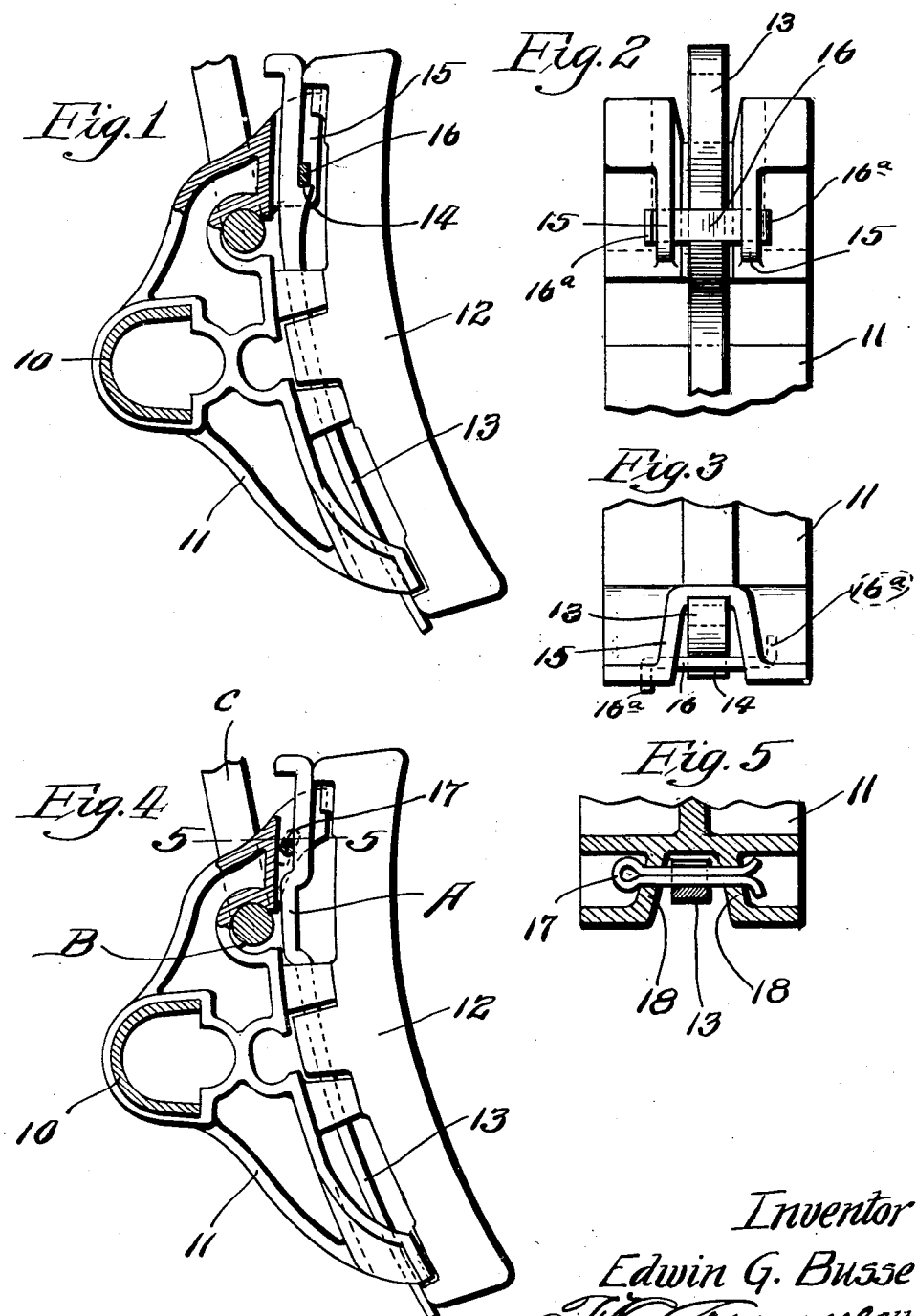

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-SHOE-KEY LOCK.

1,275,380.

Specification of Letters Patent. Patented Aug. 13, 1918.

Application filed October 4, 1917. Serial No. 194,679.

*To all whom it may concern:*

Be it known that I, EDWIN G. BUSSE, a citizen of the United States, residing at the city of Chicago, county of Cook, and State of Illinois, have invented a certain new and useful Improvement in Brake-Shoe-Key Locks, of which the following is a full, clear, and exact description, such as will enable others skilled in the art to which it appertains to make and use the same, reference being had to the accompanying drawings, forming part of this specification.

My invention relates generally to certain improvements in the construction of brake heads for railway car brake equipment, and more particularly to means for securing and retaining the brake shoe keys in locking position, it being understood that the brake shoes are retained in position upon the brake heads by means of elongated keys which are seated in the apertures of lugs formed on said brake shoes and heads.

The principal object of my invention is to provide simple means, preferably a key or cotter pin, which may be easily and quickly placed in position for use or removed therefrom, and which will form an effective lock and retaining member for the brake shoe key when the latter is properly positioned to secure the brake shoe to the head.

It will be understood that the usual brake shoe key is constructed of resilient material and when driven into proper position performs the functions of a wedge and exerts yielding pressure against parts of the head and shoe to hold the latter firmly in position and prevent vibration and rattling. I propose to provide a comparatively small locking member, preferably a key or cotter pin, the same being removably seated in the brake head and normally engaging a lug or shoulder on the brake shoe key, thereby effectively retaining the same in locking position and preventing it from becoming accidentally displaced or withdrawn.

With the foregoing and other objects in view, my invention consists in certain novel features of construction and arrangement of parts hereinafter more fully described and claimed and illustrated in the accompanying drawings, in which—

Figure 1 is an elevational view, partly in section, of a brake head, brake shoe, and brake shoe key and also showing a locking member contemplated by my invention in position on the brake head;

Fig. 2 is an elevational view of the upper portion of a brake head and showing my improved key locking means in position thereupon;

Fig. 3 is a plan view of the parts seen in Fig. 2;

Fig. 4 is an elevational view similar to Fig. 1 and showing a modified form of the brake shoe locking means;

Fig. 5 is a detail section taken approximately on line 5—5 of Fig. 4.

Referring by numerals to the accompanying drawings, and particularly to Figs. 1, 2 and 3 which illustrate a practical embodiment of my invention, 10 designates the usual brake beam, 11 a brake head positioned thereupon, and 12 the usual brake shoe, which latter is fitted to the head in the ordinary manner. The shoe 12 is firmly secured to head 11 by a brake shoe key 13 which latter, according to my invention, is provided on one side near its upper end with a shoulder 14. This shoulder may be formed by notching the face of the key, or, as shown, by forming integral with the body of the key a comparatively short outwardly projecting lug.

Formed on the upper portion of the head 11 and to the sides of the key 13, are substantially parallel webs or flanges 15, the same being suitably perforated to receive a transversely disposed locking member 16. This member is preferably in the form of a small key constructed of ductile metal and when the brake head, brake shoe and brake shoe key are properly assembled, said locking member is inserted through the apertures in the webs 15 and bears directly on top of shoulder 14 formed on the brake shoe key 13, thereby effectually holding the latter in locking position. After the locking member 16 has been properly seated in the webs or flanges 15, its ends 16ª are bent into angular positions with respect to the plane occupied by the body of said member, thereby preventing it from accidental displacement. In Figs. 4 and 5, I have shown a locking member for the form of brake shoe key shown in the Williams Patent No. 1,232,637, such key being provided with a rearward extension A which is normally positioned directly opposite the recess B in the brake head which is occupied by the lower end of the brake hanger C. The locking means for this form of key comprises a split key or cotter pin 17, the same being inserted through suitably located apertures 18 in webs or flanges at the sides of the brake head, and the central portion of said pin or key being positioned directly above the shoulder at the upper end of the rearward extension A on the brake shoe key.

A brake shoe key locking device of my improved construction is extremely simple, can be easily and quickly applied for use, can be readily removed to permit the withdrawal of the brake shoe key and the brake shoe, and when properly positioned for use in the brake head provides positive means for retaining the brake shoe key in locking position.

I am aware that my improved device is susceptible of various minor changes and modifications without departing from the scope of the invention as set forth in the appended claim.

I claim:

In a brake shoe key lock, the combination of a brake head and a brake shoe adapted to be secured in position on the brake head, a key for locking said parts together, said key extending approximately parallel to the face of the brake shoe and being provided with an integral transversely disposed shoulder intermediate its length, and a removable transversely disposed locking member mounted in the walls of one of said parts and adapted to engage, or be engaged, by said shoulder, to prevent the withdrawal of said key.

In testimony whereof I hereunto affix my signature this 20th day of September, 1917.

EDWIN G. BUSSE.

Witnesses:
E. T. WALKER,
M. F. HUNTOON.